(12) United States Patent
Kramm et al.

(10) Patent No.: US 9,238,421 B2
(45) Date of Patent: Jan. 19, 2016

(54) SEAT ADJUSTMENT APPARATUS

(75) Inventors: Lars Kramm, Trippstadt (DE);
Manfred Roseboom, Elmstein (DE)

(73) Assignee: Keiper GmbH & Co. KG,
Kaiserslautern (DE)

( * ) Notice: Subject to any disclaimer, the term of this patent is extended or adjusted under 35 U.S.C. 154(b) by 85 days.

(21) Appl. No.: 13/579,478

(22) PCT Filed: Apr. 8, 2011

(86) PCT No.: PCT/EP2011/001744
§ 371 (c)(1),
(2), (4) Date: Aug. 16, 2012

(87) PCT Pub. No.: WO2011/128043
PCT Pub. Date: Oct. 20, 2011

(65) Prior Publication Data
US 2013/0049426 A1 Feb. 28, 2013

(30) Foreign Application Priority Data

Apr. 13, 2010 (DE) .......................... 10 2010 015 140

(51) Int. Cl.
*F16H 21/00* (2006.01)
*B60N 2/02* (2006.01)
*B60N 2/225* (2006.01)

(52) U.S. Cl.
CPC .............. *B60N 2/0232* (2013.01); *B60N 2/225* (2013.01); *B60N 2002/024* (2013.01); *B60N 2205/50* (2013.01)

(58) Field of Classification Search
CPC ................... B60N 2/0232; B60N 2/22; B60N 2002/0236; B60N 2002/024; B60N 2205/50
USPC ................. 74/20, 21, 22 R, 22 A, 23, 24, 25; 297/71, 260.2, 271.3
See application file for complete search history.

(56) References Cited

U.S. PATENT DOCUMENTS 6,546,975 B1 * 4/2003 Liao et al. ...................... 144/130
6,712,430 B2 * 3/2004 Ito et al. ......................... 297/362
(Continued)

FOREIGN PATENT DOCUMENTS

CN 201171513 Y 12/2008
DE 7441537 U 4/1975
(Continued)

OTHER PUBLICATIONS

International Search Report mailed Aug. 1, 2012.
(Continued)

*Primary Examiner* — William Kelleher
*Assistant Examiner* — Zakaria Elahmadi
(74) *Attorney, Agent, or Firm* — Fletcher Yoder, P.C.

(57) ABSTRACT

A seat adjustment apparatus for adjusting seat elements of a seat in a motor vehicle comprises a gear mechanism housing of an electric motor/gear mechanism unit attached to a fitting part of a first seat element by an attachment element. A rotation movement can be transmitted to a rotation axis by the gear mechanism unit of the electric motor/gear mechanism unit. The attachment element can be attached to the gear mechanism housing by an end region and has an expansion plug part which projects through a recess in the fitting part, and has a passage opening axial to the recess in the fitting part and an identical cross section. An expansion element, which radially expands the expansion plug part, can be inserted into the passage opening.

11 Claims, 5 Drawing Sheets

(56) References Cited

U.S. PATENT DOCUMENTS

| | | | |
|---|---|---|---|
| 6,964,076 B2 * | 11/2005 | Zhuan | 15/22.2 |
| 2004/0075325 A1 * | 4/2004 | Assmann et al. | 297/362 |
| 2005/0115340 A1 * | 6/2005 | Sasaki et al. | 74/25 |
| 2005/0221957 A1 * | 10/2005 | Sheng | 477/162 |
| 2010/0300228 A1 * | 12/2010 | Koga et al. | 74/425 |

FOREIGN PATENT DOCUMENTS

| | | | | |
|---|---|---|---|---|
| DE | 19503268 | * | 8/1996 | F18B 13/14 |
| DE | 10155398 C1 | | 12/2002 | |
| DE | 102004052604 B3 | | 4/2006 | |
| DE | 202007003713 | | 7/2008 | |
| DE | 19503268 A1 | | 8/2008 | |
| FR | 2831228 | | 4/2003 | |
| JP | 2006305026 | | 11/2006 | |

OTHER PUBLICATIONS

Chinese Office Action dated May 27, 2014.

* cited by examiner

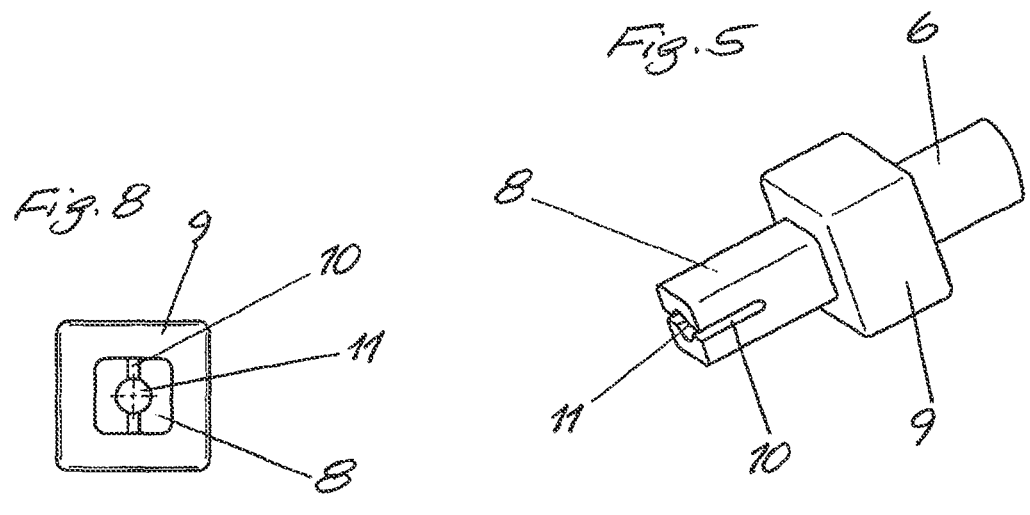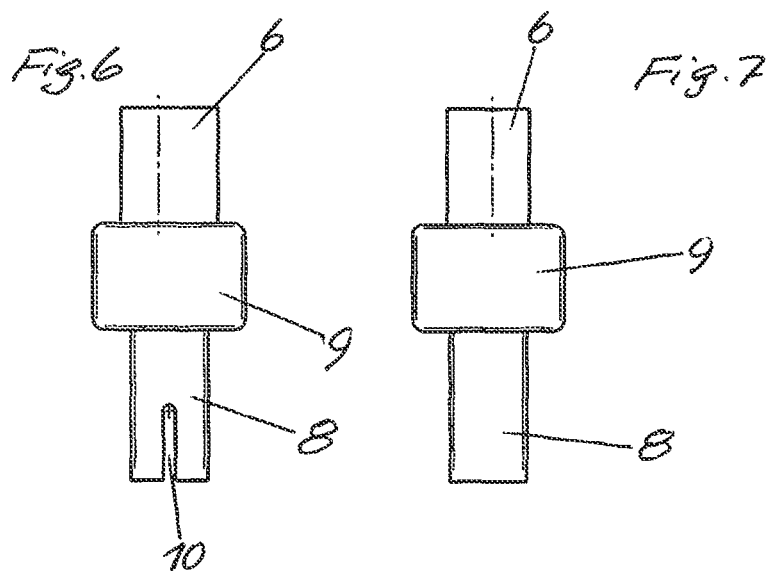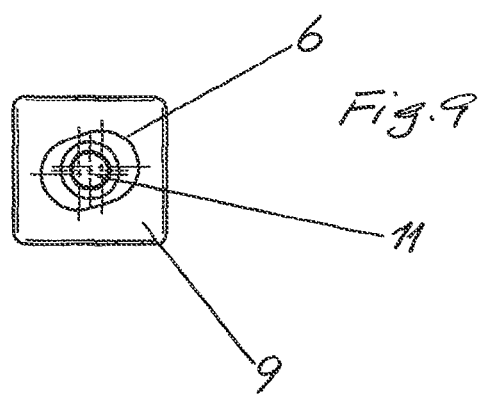

SEAT ADJUSTMENT APPARATUS

CROSS REFERENCE TO RELATED APPLICATIONS

This application claims priority from and the benefit of PCT Application No. PCT/EP2011/001744, filed on Apr. 8, 2011, and German Patent DE 10 2010 015 140.8, filed on Apr. 13, 2010; both entitled "Seat Adjustment Apparatus", which are herein incorporated by reference.

BACKGROUND

The invention relates to a seat adjustment apparatus for adjusting seat elements of a seat in a motor vehicle, wherein an electric motor/gear unit is fastened to a fitting part of the first seat element by means of a fastening element and a rotational movement is able to be transmitted to a rotational axis by means of the electric motor/gear unit.

By means of such a seat adjustment apparatus, in particular, the backrest of a seat is able to be adjusted in its inclination relative to the seat cushion.

To this end, the electric motor/gear unit has to be fastened to the fitting part of the seat element to be adjusted.

SUMMARY

It is the object of the invention to provide a seat adjustment apparatus of the type mentioned in the introduction, which is of simple construction and is able to be easily mounted.

This object is achieved according to the invention by the fastening element being able to be fastened by a retaining element to the electric motor/gear unit and having an expansion plug part protruding through a recess in the fitting part and comprising a through-opening, which is axial and has the same cross section relative to a recess of the fitting part, into which through-opening an expansion element, radially expanding the expansion plug part, is able to be inserted.

After arranging the fastening element on the electric motor/gear unit, by inserting the expansion plug part into the recess of the fitting part and inserting the expansion element into the through-opening of the expansion plug part, said expansion plug part is expanded radially and clamped against the peripheral wall of the recess of the fitting part. Thus the fastening element together with the electric motor/gear unit are fixedly connected to the fitting part of the first seat element, preferably fixedly connected to the backrest.

The same electric motor/gear unit may be used for different seats by means of different fastening elements, which reduces the parts and logistic costs.

In addition, in the event of a fault in the fastening element, only the fastening element rather than the entire electric motor/gear unit has to be replaced in a cost-effective manner.

After inserting the expansion plug part into the recess of the fitting part but before inserting the expansion element, in order to hold the electric motor/gear unit in a manner which is easy to mount on the fitting part, the expansion plug part may comprise one or more resiliently deformable catches protruding radially outward and which, when the expansion plug part is fully inserted into the recess of the fitting part, bear against the side of the fitting part remote from the electric motor/gear unit and thus prevent the expansion plug part from falling out of the recess again. This simplifies the subsequent insertion of the expansion element.

In this case, the catches may be configured integrally with the fastening element.

The fastening element is able to be produced easily and cheaply, for example by plastics injection-molding when it consists of a plastics material, and the expansion element is a screw with a wooden screw thread which may be screwed into the through-opening of the expansion plug part.

Alternatively, the screw may also have a metric thread.

It is, however, also possible for the fastening element to consist of a metal and the expansion element to be a cone which may be driven into the through-opening of the expansion plug part.

For arranging the fastening element on the electric motor/gear unit, it is advantageous if the retaining element of the fastening element extends axially relative to the expansion plug part in the manner of a pin and is able to be inserted and fixed into a corresponding opening of the electric motor/gear unit.

In order to fasten the electric motor/gear unit in a torsionally rigid manner to the fitting part, the pin-like retaining element and the opening of the electric motor/gear unit have a non-rotationally symmetrical cross section, such as for example a polygonal cross section or a stadium-shaped cross section.

For easy fastening of the fastening element to the electric motor/gear unit, in the region between the expansion plug part and the retaining element, the fastening element may have a spacer of greater radial dimension than the opening formed continuously in the electric motor/gear unit, and the screw is supported with its screwhead on the opening region on the side of the opening of the electric motor/gear unit remote from the fitting part and is screwed with its thread into the fastening element.

If, moreover, the screw is screwed with its thread into the through-opening of the expansion plug part or into the cone, not only the fastening element is fastened to the electric motor/gear unit but also the entire electric motor/gear unit is fastened to the fitting part of the first seat element by expanding the expansion plug part, in a manner which is easy to mount and which dispenses with components by using a single screw.

Moreover, both the joining direction of the electric motor/gear unit to the fitting part and the screwing-in direction of the screw are the same, which leads to easy accessibility and simplifies mounting.

If the electric motor/gear unit is arranged on the side of the fitting part facing the seat elements, it may be arranged inside the backrest to save constructional space.

The further function of positioning the electric motor/gear unit at a distance from the fitting part is fulfilled by the fastening element in the region between the expansion plug part and the retaining element having a spacer which has a greater radial dimension than the recess of the fitting part and the opening of the electric motor/gear unit, wherein the spacer is arranged between the fitting part and the electric motor/gear unit to bear against said elements.

Thus, disturbing noises are not produced by the electric motor/gear unit rubbing against or striking the fitting as a result of vibrations during operation of the motor vehicle.

Advantageously, the electric motor/gear unit comprises a gear housing, wherein the fastening element is able to be fastened to the gear housing by the retaining element. In this case, the gear housing advantageously contains the opening into which the retaining element may be inserted.

DRAWINGS

An exemplary embodiment of the invention is shown in the drawings and is described in more detail hereinafter, in which:

FIG. 1 shows a perspective view of an electric motor/gear unit with a separate fastening element FIG. 2 shows a perspective view of the electric motor/gear unit according to FIG. 1 with the fastening element arranged thereon FIG. 3 shows a perspective internal view of a seat adjustment apparatus with an electric motor/gear unit according to FIG. 1 before fastening FIG. 4 shows a perspective internal view of the seat adjustment apparatus according to FIG. 3 with the electric motor/gear unit fastened FIG. 5 shows a perspective view of the fastening element of the seat adjustment apparatus according to FIG. 3

FIG. 6 shows a view of the fastening element according to FIG. 5

FIG. 7 shows a side view of the fastening element according to FIG. 5

FIG. 8 shows a bottom view of the fastening element according to FIG. 5

FIG. 9 shows a plan view of the fastening element according to FIG. 5.

DETAILED DESCRIPTION

Figure 1:
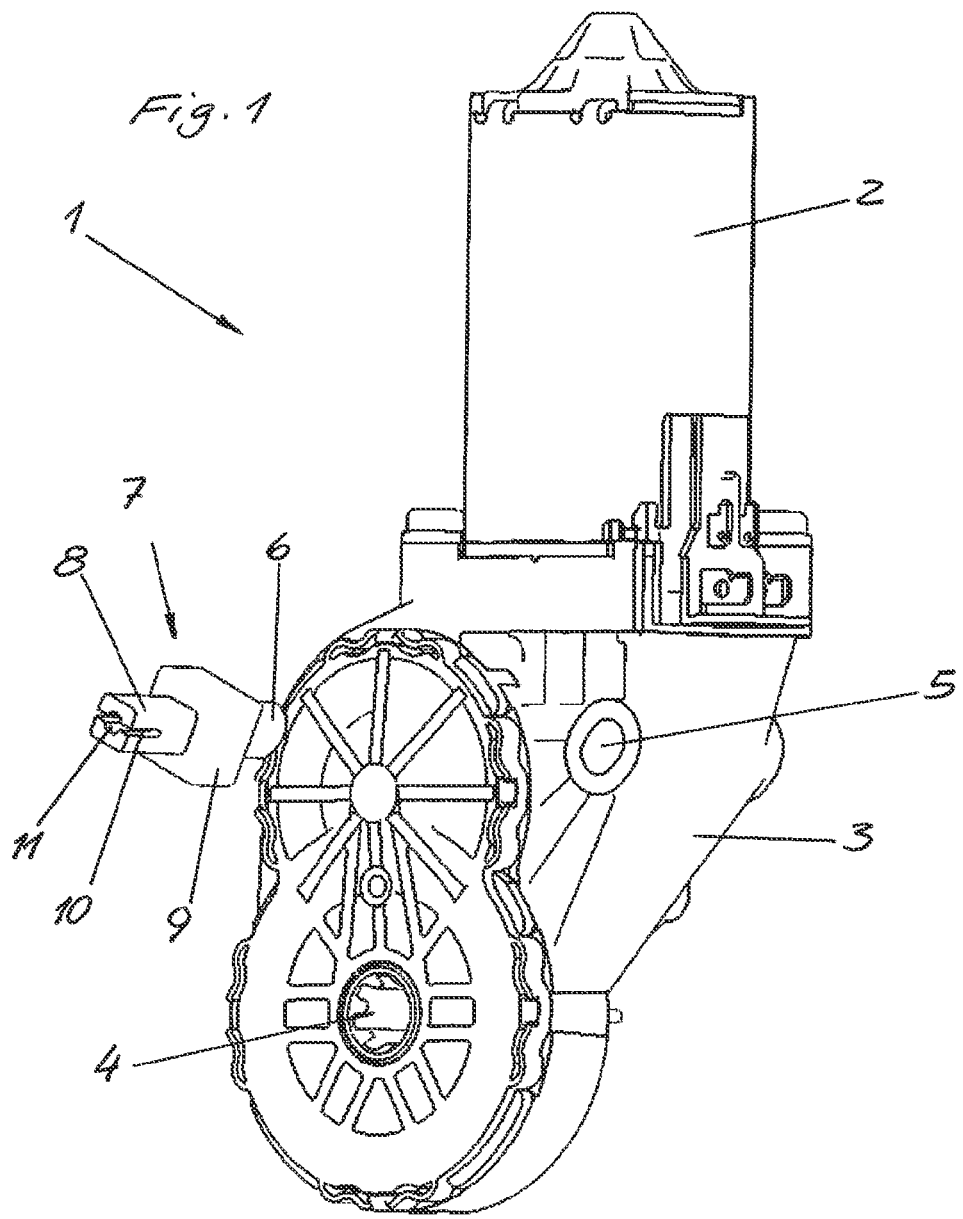

An electric motor/gear unit 1 is shown in the figures, said electric motor/gear unit comprising an electric motor 2 and a gear housing 3 coupled thereto.

A gear unit which may be driven by the electric motor 2 is arranged in the gear housing 3, said gear unit comprising an output gear 4 provided with an internal profile.

A continuous opening 5 having a stadium-like cross section is formed on the gear housing 3, parallel to the rotational axis 17 of the output gear 4.

A pin-like retaining element 6 may be inserted into said opening 5, having the same external contour.

The retaining element 6 is part of a fastening element 7 made of plastics material which has an expansion plug part 8 coaxial with the retaining element 6, wherein a spacer 9 of square cross section with a greater radial dimension than the retaining element 6 and the expansion plug part 8 is formed between the retaining element 6 and the expansion plug part 8.

The expansion plug part 8 also has a square cross section and a central slot 10 extending over approximately half of its length toward the free end thereof.

A through-opening 11 formed as a stepped bore extends coaxially through the retaining element 6, the large step of said through-opening extending through the retaining element 6 and the spacer 9 and the small step thereof extending through the expansion plug part 8.

The backrest of the seat of a motor vehicle has in each case on its two side regions a fitting part 12 fixedly connected to the backrest. In one of the fitting parts 12 a continuous recess is formed for receiving the expansion plug part 8.

Figure 2:
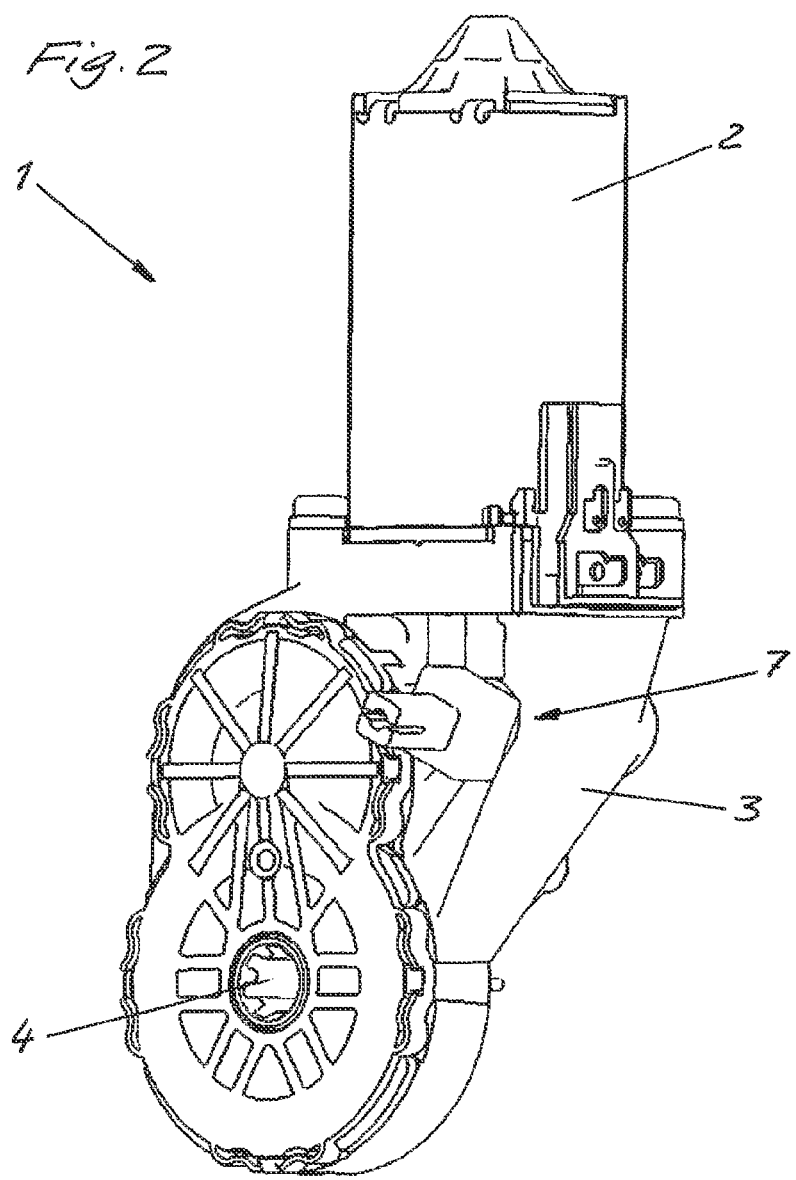
Figure 3:
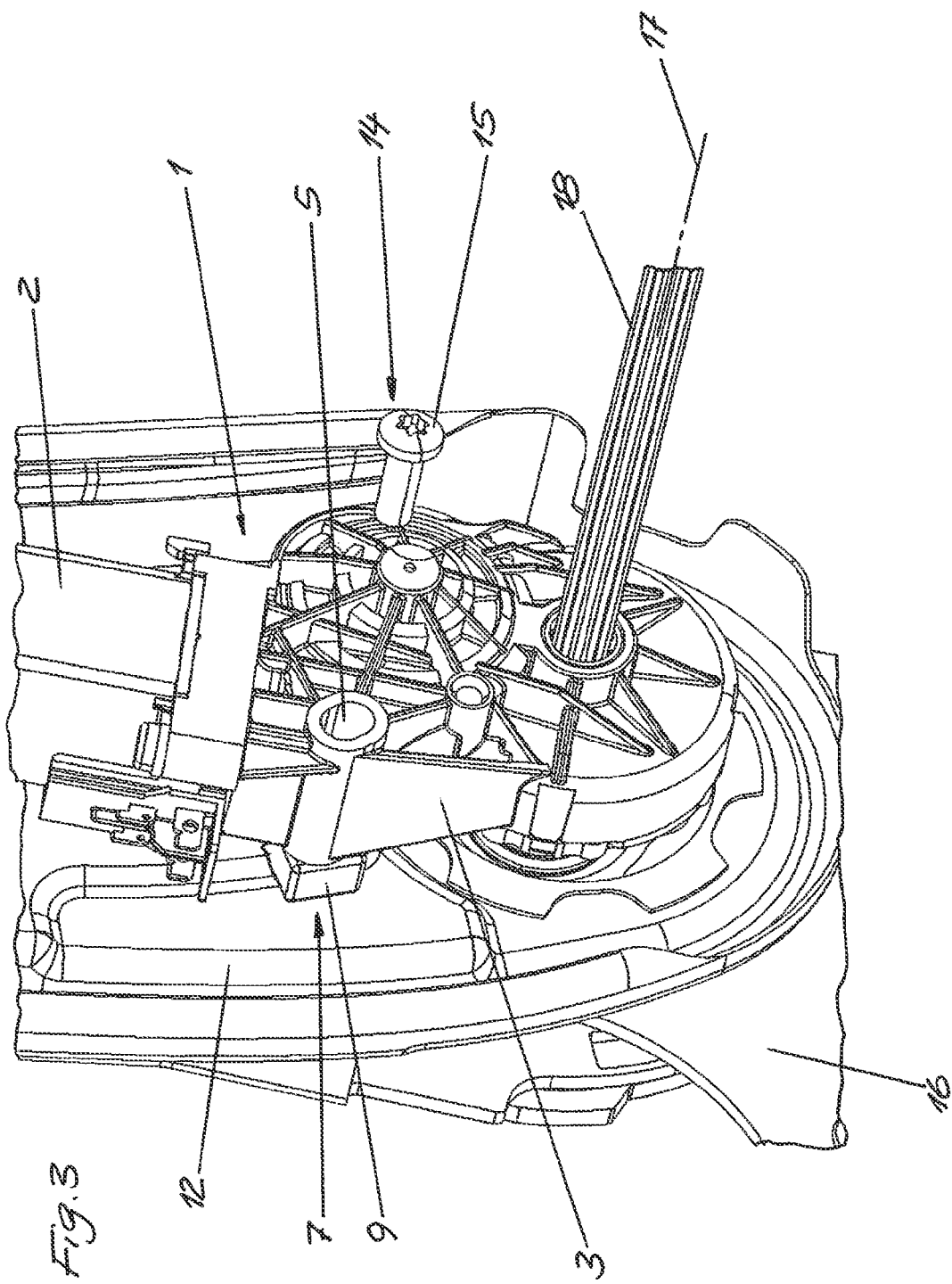
Figure 4:
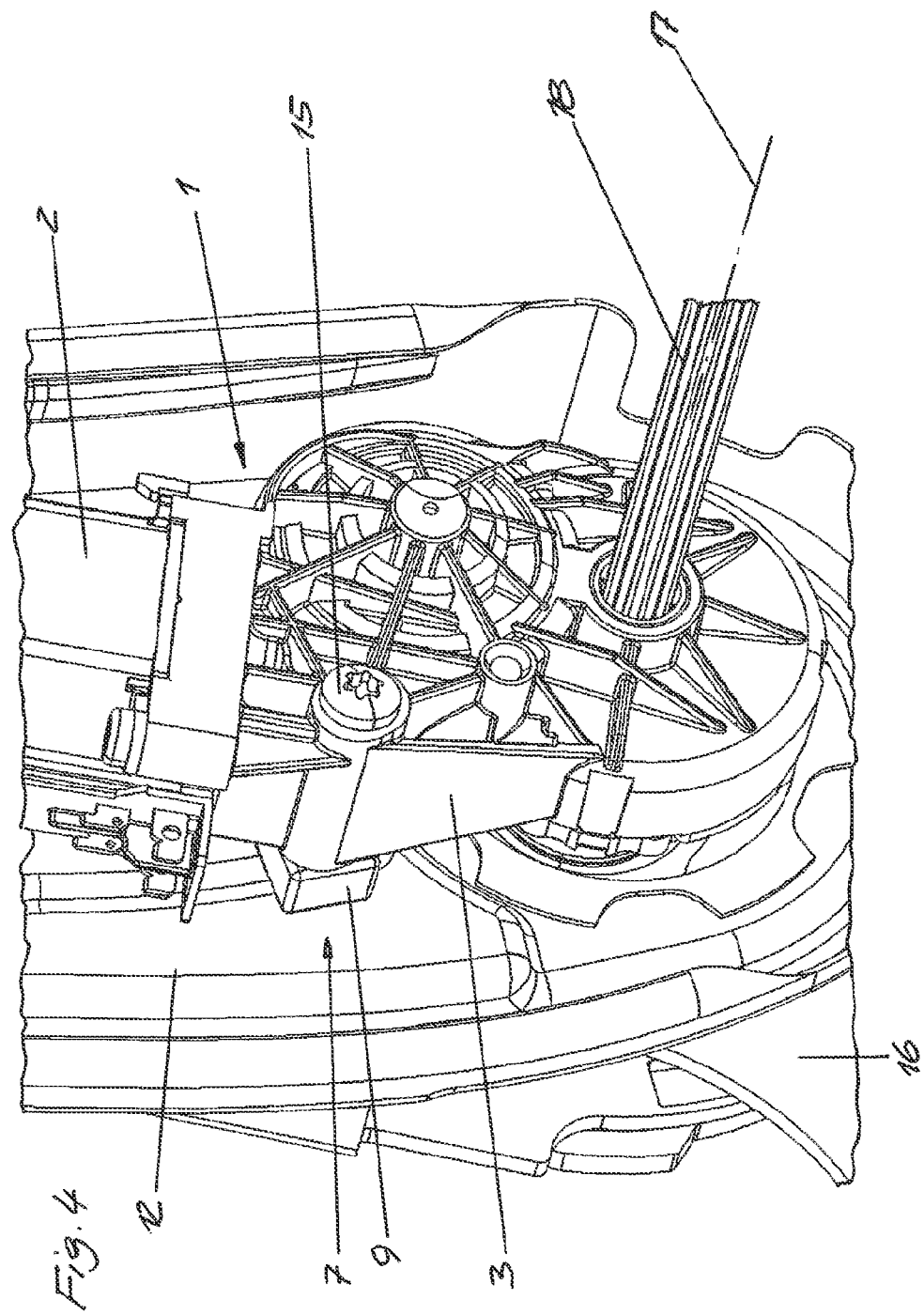

After inserting the retaining element 6 into the opening 5 (FIG. 2) until the spacer 9 bears against the gear housing 3, the entire sub-assembly consisting of the electric motor/gear unit 1 and the fastening element 7 is moved into the region between the two fitting parts 12 and the expansion plug part 8 of the fastening element 7 is inserted through the recess in the fitting part 12 until the spacer 9 bears against the fitting part 12.

The recess has the same cross section as the expansion plug part 8. From the side remote from the fitting part 12, a screw 14 with a wooden screw thread is inserted through the large step of the through-opening 11 and screwed into the small step of the through-opening 11.

As the screwhead 15 of the screw 14 is supported on the opening edge of the opening 5 remote from the fitting part 12, the gear housing 3 is initially forced by means of the screw 14 via the spacer 9 against the fitting part 12.

As the diameter of the screw 14 is greater than the diameter of the small step of the through-opening 11, the expansion plug part 8 is then radially expanded and forced against the wall of the recess of the fitting part 12. As a result, the electric motor/gear unit 1 is fixedly connected to the fitting part 12.

The fitting part 12 is rotatable about an axis extending transversely to the longitudinal dimension of the motor vehicle and pivotable relative to a second fitting part 16 of a seat cushion of the seat.

The axis about which the fitting part 12 may be rotated extends coaxially to the rotational axis 17 of the output gear 4 of the gear unit.

A profiled shaft 18 with an external profile corresponding to the internal profile of the output gear 4 is inserted into the internal profile of the output gear 4 and extends coaxially to the rotational axis 17. The profiled shaft 18 transmits the rotational movement produced by the electric motor/gear unit 1 to the two fitting parts 12 located on the side regions of the backrest of the seat.

The invention claimed is:

1. A seat adjustment apparatus configured to adjust seat elements of a seat in a motor vehicle, comprising an electric motor/gear unit non-rotatably fastened to a first fitting part of a first seat element by a fastening element, wherein a rotational movement is able to be transmitted to a rotational axis by the electric motor/gear unit, and wherein the fastening element is able to be fastened by a retaining element to the electric motor/gear unit and has an expansion plug part protruding through a recess in the first fitting part, the recess of the first fitting part is spaced apart from the rotational axis, the expansion plug part comprises a through-opening which is axial, the expansion plug part has the same cross section as the recess of the first fitting part, and the expansion plug part is configured to receive an expansion element into the through-opening to radially expand the expansion plug part;

wherein the electric motor/gear unit and the first fitting part are configured to rotate about the rotational axis relative to a second fitting part, the retaining element includes a spacer which has a greater radial dimension than the recess of the first fitting part and an opening of the electric motor/gear unit, the spacer is arranged between the first fitting part and the electric motor/gear unit, and the spacer bears against the first fitting part and the electric motor/gear unit.

2. The seat adjustment apparatus as claimed in claim 1, wherein the expansion plug part comprises one or more resiliently deformable catches protruding radially outward and which, when the expansion plug part is fully inserted into the recess of the first fitting part, bear against a side of the first fitting part remote from the electric motor/gear unit.

3. The seat adjustment apparatus as claimed in claim 2, wherein the catches are integrally formed with the fastening element.

4. The seat adjustment apparatus as claimed in claim 1, wherein the fastening element comprises a plastic material and the expansion element comprises a screw with a wooden screw thread screwed into the through-opening of the expansion plug part.

5. The seat adjustment apparatus as claimed in claim 1, wherein the fastening element comprises a metal and the expansion element comprises a cone driven into the through-opening of the expansion plug part.

6. The seat adjustment apparatus as claimed in claim 1, wherein the retaining element of the fastening element extends axially relative to the expansion plug part in the manner of a pin and is able to be inserted and fixed into a corresponding opening of the electric motor/gear unit.

7. The seat adjustment apparatus as claimed in claim 6, wherein a screw is supported with its screwhead on an opening region on a side of the opening of the electric motor/gear unit remote from the first fitting part, and is engaged with its thread into the fastening element.

8. The seat adjustment apparatus as claimed in claim 7, wherein the screw is engaged with its thread into the through-opening of the expansion plug part.

9. The seat adjustment apparatus as claimed in claim 1, wherein the electric motor/gear unit is arranged on a side of the first fitting part facing the seat elements.

10. The seat adjustment apparatus as claimed in claim 1, wherein the electric motor/gear unit comprises a gear housing to which the fastening element is fastened by the retaining element.

11. The seat adjustment apparatus as claimed in claim 5, wherein the screw is engaged with its thread into the cone.

\* \* \* \* \*